2 Sheets--Sheet 1.

E. T. BUSSELL.
Revolving Disc Plows.

No. 128,588. Patented July 2, 1872.

Witnesses.
A. Ruppert.
Joseph Forest

Inventor.
Erastus T. Bussell
By Theodore Mungen
Attorney

E. T. BUSSELL.

Revolving Disc Plows.

No. 128,588.

Patented July 2, 1872.

Witnesses.
A. Ruppert.
Joseph Forrest

Inventor.
Erastus T. Bussell.
By Theodore Mungen
Attorney

No. 128,588

UNITED STATES PATENT OFFICE.

ERASTUS T. BUSSELL, OF INDIANAPOLIS, INDIANA, ASSIGNOR TO WILLIAM M. BUSSELL, OF SAME PLACE.

IMPROVEMENT IN PLOWS.

Specification forming part of Letters Patent No. 128,588, dated July 2, 1872; antedated June 15, 1872.

*To all whom it may concern:*

Be it known that I, ERASTUS T. BUSSELL, of Indianapolis, in the county of Marion and State of Indiana, have invented certain new and useful Improvements in Revolving-Disk Plows; and I hereby declare the following to be a full, clear, and exact description of the same, reference being had to the accompanying drawing making a part of this specification, in which—

Figure 1:
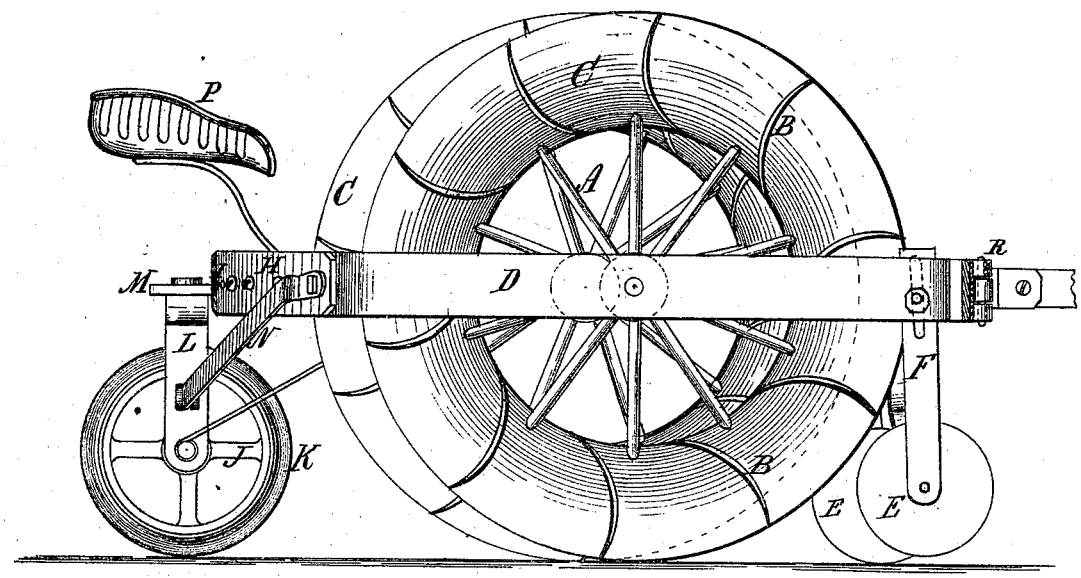
Figure 2:
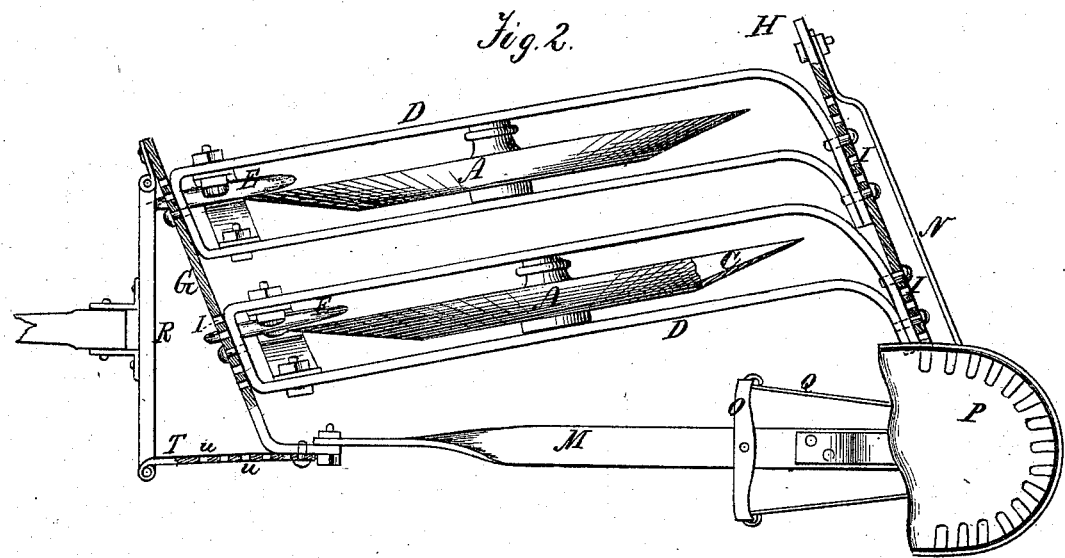
Figure 3:
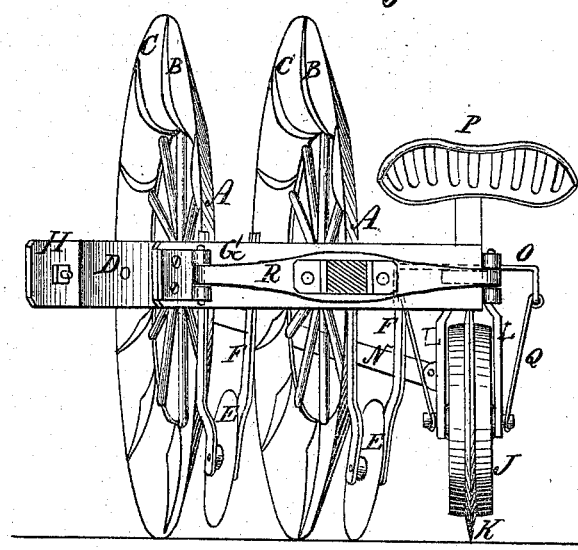

Figure 1 is a side elevation; Fig. 2, a plan view, the bar for adjusting the tongue being shown in section; and Fig. 3 is a front view.

This invention relates to certain improvements in revolving-disk plows; and consists: First, of a metallic zone connected with a hub by radial spokes and provided with a series of ribs or flanges, each of which extends across its inner face in the direction of a cycloidal curve, for the purpose of cutting, displacing, and mixing the surface and subsoils for agricultural purposes. Secondly, of a rudder-wheel having a vertical flange located centrally on its periphery, a traction-arm, and a vibrating lateral-pressure arm as connecting mediums, and a cross-bar for operating the rudder-wheel, in combination with a plow-frame, provided with a revolving disk or disks, arranged oblique to the line of draft; the object of this part of the invention being to counteract the pressure of the soil upon the rear of the disks and hold them oblique to the line of draft.

In the drawing, A is the revolving disk, consisting of the metallic zone C, connected to a hub by radial spokes and provided with ribs or flanges B, which extend across the inner face of the zone C in the direction of cycloidal curves. By this form of curve the flanges B enter the ground easily, very little resistance being offered to them. Any other form would offer great resistance, and the more it varies from this form the greater the resistance offered. Each revolving disk A is supported on an independent axis in a frame, D, which should be constructed so as to leave a sufficient space between the side of the frame and the zone C to permit the soil to be carried above said side of the frame. An outward curve, commencing immediately in the rear of the hub of the disk A and extending to the rear of the frame D, best accomplishes this result. A colter-wheel, E, supported by an adjustable bracket, F, secured to the front of the frame D, cuts into the ground and clears the way immediately in front of the disk A, which sinks into the ground to a much greater depth by reason of its weight and the downward pull, caused by the resistance of the soil to the ascending flanges B. When the zone C of the disk A is of steel and has a sharp cuttting periphery, and the soil is mellow and clear of trash, the colter-wheel E may be dispensed with. The frame D is attached in front to a bar, G, and in rear to a bar, H. When more than one, or a gang of disks, A, are used, each frame D is secured to the bars G and H, which are provided with perforations I for the reception of the bolts which secure the frames D thereto, so that the frames can be laterally adjusted to increase or diminish the distance between the disks A. The disk on the furrow-row side of the plow is slightly in advance of the one next to it, and this latter disk is slightly in advance of the one next to it, and thus throughout the entire gang. By this arrangement each disk turns its furrow without interfering with the other disks. The rudder-wheel J, provided with the vertical flange K located centrally on the periphery thereof, has its bearings in a bifurcated bracket, L, pivoted in the traction-arm M, which is hinged to the connecting-bar G. A vibrating lateral-pressure arm, N, is connected to the bifurcated bracket L in such a manner as to permit the bracket L to turn on the pivot in the rear end of the traction-arm M, and increase or diminish the resistance of the rudder-wheel J to the pressure of the soil against the rear of the disks A. The opposite end of the arm N is hinged to the rear connecting-bar H, and should be of sufficient length to readily permit the rudder-wheel J to play up and down. A short cross-bar or tiller, O, is pivoted to the traction-arm M, so as to be within reach of the feet of the driver when occupying the spring-seat P secured to the traction-arm M, so that the weight of the driver will come directly upon the rudder-wheel J. Tiller-rods Q, secured to the ends of the tiller O, connect it with the journals of the rudder-wheel J, so that the rudder-wheel may be governed by the tiller O and directed at will. The tongue-bar R is hinged at one end to the connecting-bar G, and at the other to an adjusting-bar, T, which is provided with the perforations U and secured to the connecting-bar G immediately in front of the traction-arm M by a bolt passing through any one of the perforations U.

The colter-wheels E are slightly inclined, so as to nearly form a line with the inner face of the zone C. They are used to cut the hard soil or surface obstructions in advance of the disks A and make an opening, in which the latter follow. The line of draft is in the direction of the inner face of the disk at its forward edge, and the tongue of the plow should be parallel with this line when the plow is in operation.

When it is necessary to take the plow from one field to another the tongue should be adjusted so as to be in line with the parallel sides of the frames D, and when so adjusted the disk penetrates the ground so slightly as to offer but little resistance.

By turning the rudder-wheel J inwardly when the plow is in operation the resistance of the disk to the pressure of the soil is increased and the disk next the furrow-side of the plow turns a broader furrow; the other disks will also turn broader furrows if suitably adjusted. By turning the rudder-wheel J outwardly we have a result the converse of the above.

The connecting-bars G and H and the frames D practically form a rhomboid, the connecting-bars G and H being the shorter sides thereof when one, two, or three frames D are connected. The frames D form the short side of the figure when four or more are used.

Having thus described my invention, what I claim as new and useful, and desire to secure by Letters Patent, is—

1. A revolving disk, A, composed of the metallic zone C, connected with a hub by radial spokes, and provided with a series of ribs or flanges, B, each of which extends across the inner face of the zone C in the direction of a cycloidal curve, for the purpose hereinbefore set forth.

2. The rudder-wheel J provided with the vertical flange K and supported in bearings in the adjustable bifurcated bracket L, the traction-arm M, the vibrating lateral pressure-arm N, and the tiller O provided with the rods Q, all arranged relatively one to the other, in combination with the plow-frame, as described.

In testimony that I claim the foregoing improvements in revolving-disk plows as above described I have hereunto set my hand and seal this 24th day of October, 1871.

ERASTUS T. BUSSELL. [L. S.]

Witnesses:
F. TENNEY,
THO. H. HARBIN.